United States Patent [19]

Fujisawa et al.

[11] Patent Number: 4,607,263

[45] Date of Patent: Aug. 19, 1986

[54] PEN TYPE PLOTTING APPARATUS HAVING AUTOMATIC REWRITING CONTROL

[75] Inventors: Kyuichi Fujisawa, Tonan; Nobuko Fujiwara, Morioka, both of Japan

[73] Assignee: Alps Electric Co., Ltd., Japan

[21] Appl. No.: 667,212

[22] Filed: Nov. 1, 1984

[30] Foreign Application Priority Data

Nov. 2, 1983 [JP] Japan ............................... 58-206559

[51] Int. Cl.[4] ........................ G01D 15/16; B41G 3/00

[52] U.S. Cl. .................................. 346/139 R; 400/17

[58] Field of Search ............... 346/139 R; 400/17, 18, 400/19

[56] References Cited

U.S. PATENT DOCUMENTS 4,405,931 9/1983 Fujisawa ........................ 346/139 R 4,417,254 11/1983 Woods ........................... 346/139 R

*Primary Examiner*—E. A. Goldberg

*Assistant Examiner*—M. Reinhart

*Attorney, Agent, or Firm*—Guy W. Shoup

[57] ABSTRACT

In a pen type plotting apparatus, a pen type X-Y recording mechanism is provided for driving a carriage supporting a pen, a recording paper and the pen to their operative positions. The driving operation of the X-Y recording mechanism is controlled by a recording control portion comprising a recording control means which provides a first operational mode for carrying out an ordinary recording operation and a second operational mode for reprinting a predetermined amount of initially recorded patterns for a predetermined number of times, and means for selecting the second operational mode when a recording operation is initiated by turning a power source for the apparatus to on.

2 Claims, 6 Drawing Figures

PEN TYPE PLOTTING APPARATUS HAVING AUTOMATIC REWRITING CONTROL

BACKGROUND OF THE INVENTION

1. Field of the Invention:

This invention relates generally to pen type plotting apparatus, and more particularly to a type thereof including means for reprinting an initial part of printed patterns and the like in an overlying manner for avoiding thinning or breaking of the same, which tends to occur during the initial part of the printing operation.

2. Description of Prior Art:

Pen type plotting apparatus are widely used in data processing devices and the like for recording data such as characters, figures and diagram.

A conventional pen type plotting apparatus will now be described with reference to FIGS. 1, 2 and 3. As shown in FIG. 1, a host computer 1 delivers printing data in the form of recording control commands to a pen type plotting apparatus 2. Within the pen type plotting apparatus 2, a recording control portion 3 generates, for instance, character patterns based on the printing data and finds out vector or stroke data required for forming the character patterns. The recording control portion 3 then applies the vector data to an X-Y recording mechanism 4 as analog control signals for controlling X and Y coordinates, simultaneous with a pen driving signal. Upon reception of the analog control signal and the pen driving signal delivered from the record control portion 3, the X-Y recording mechanism 4 operates a motor and an electromagnet included therein for recording desired character patterns on a recording paper 5.

FIG. 2 illustrates a practical construction of the pen type X-Y recording mechanism 4, wherein numeral 5 designates the recording paper, numeral 6 designates a carriage motor, 7 a carriage, 8 a ball pen, 9 a paper feed motor, 10 a rubber roller, and numeral 11 designates the electromagnet. Under the control of the X coordinate control signal, the carriage motor 6 is driven to control the X coordinate position of the carriage 7. On the other hand, the Y coordinate control signal controls the paper feed motor 9 so as to rotate the rubber roller 10 and to control Y-coordinate position of the recording paper 5 relative to the carriage 7. The electromagnet 11 is excited by the pen driving signal. Upon excitation the electromagnet 11 causes the ball pen 8 secured to the carriage 7 to project toward the recording paper 5, thereby setting the ball pen in a recordable condition.

FIG. 3 is an explanatory diagram for a record control operation in the pen type plotting apparatus of the above described construction. As an example, the diagram illustrates the locus of the tip of the ball pen 8 in a case where characters A, B and C are recorded. In the drawing, numeral 12 designates the starting point for recording the character A while numeral 13 designates the terminating point. Numerous arrow marks indicate the moving directions of the tip of the ball pen 8. For each of the terminating points of the linear strokes in the patterns, the recording control portion 3 in FIG. 1 determines X-Y coordinate values representing an objective position in a digital manner, D/A converts the coordinate values, and applies the converted results through a servo amplifier to the carriage motor 6 and the paper feeding motor 9.

In the above described conventional pen type plotting apparatus, however, a problem tends to be encountered when the apparatus has not been used for a considerable length of time, in that the ink in the tip portion of the ball pen is solidified and hardly delivered during an initial part of the recording operation, thus causing thinning or breaking of recorded characters and deteriorating the quality of the recorded results. For obviating the above described difficulty, some of the conventional apparatus have included means for effecting exercise writing of, for instance, a rectangular pattern at a corner of the recording paper automatically at the time of initiation of the recording operation. Such a procedure is found to be disadvantageous because a useless recording is effected on the recording paper.

SUMMARY OF THE INVENTION

An object of the present invention is to provide a pen type plotting apparatus wherein thinning and breaking in lines of patterns tending to occur during the initial part of the recording operation, and the necessity of exercise printing of a special pattern before the initiation of the recording operation can be substantially eliminated.

Another object of the invention is to provide a pen type plotting apparatus wherein the period of not operating pen is surveyed, and when the period exceeds a predetermined length, the characters or patterns which have been printed in the initial part of the printing operation are reprinted a predetermined number of times for realizing clear recording of the characters or patterns without requiring exercise printing.

These and other objects of the present invention can be achieved by a pen type plotting apparatus comprising a pen type X-Y recording mechanism for driving a carriage supporting a pen, a recording paper, and the pen to ther operative positions, and a recording control portion for controlling the pen type X-Y recording mechanism, the recording control portion comprising recording control means which provides a first operational mode for carrying out an ordinary recording operation, and a second operational mode for reprinting a predetermined amount of initially recorded patterns for a predetermined number of times, and means for selecting the second operational mode when a recording operation is initiated by turning a power source for the apparatus to on.

DESCRIPTION OF THE PREFERRED EMBODIMENT

The invention will now be described with reference to FIGS. 4, 5 and 6.

Figure 1:
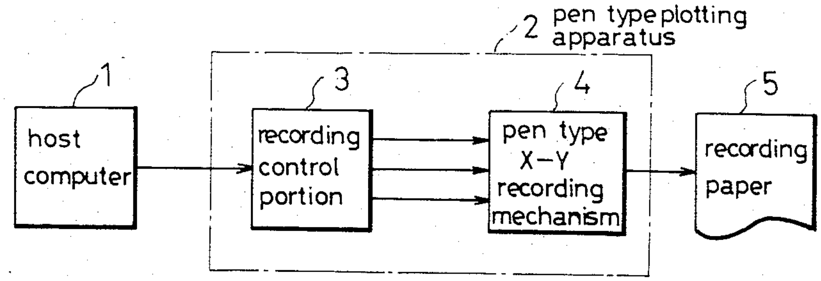
Fig.1 PRIOR ART
FIG. 1 is a block diagram showing a conventional pen type plotting apparatus.
Figure 2:
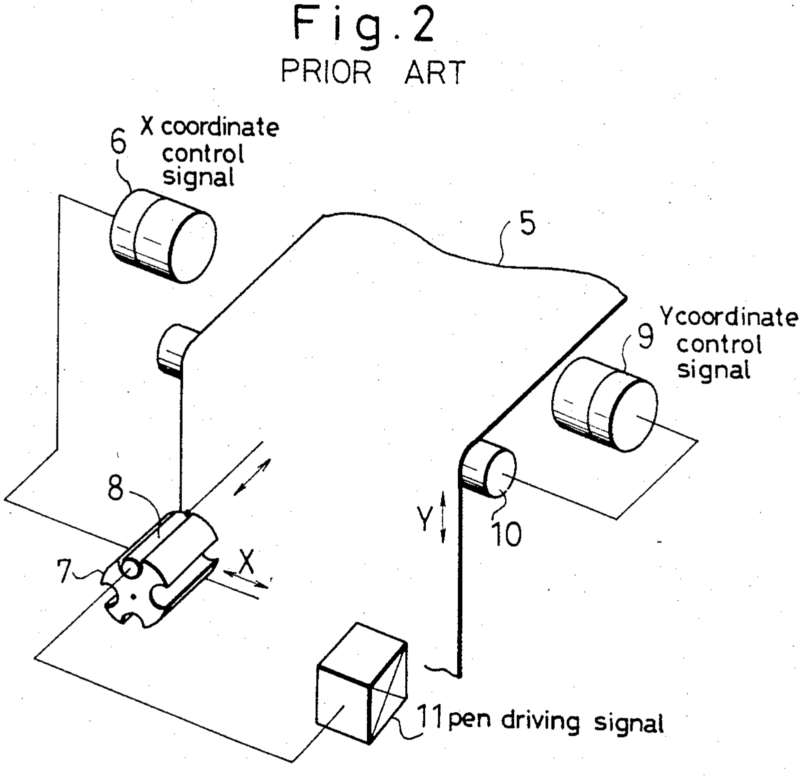
Fig.2 PRIOR ART
FIG. 2 is a perspective view showing a pen type X-Y recording mechanism included in the pen type plotting apparatus shown in FIG. 1.
Figure 3:
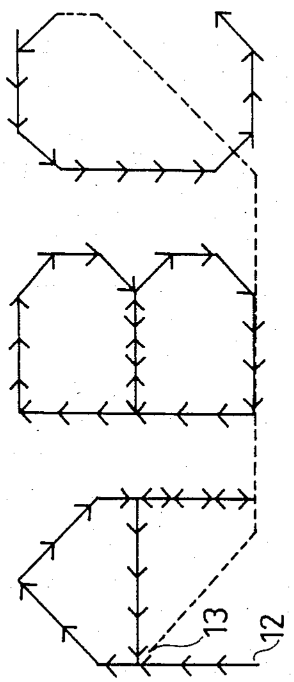
FIG. 3 is an explanatory diagram showing a recording control operation of the plotting apparatus.
Figure 4:
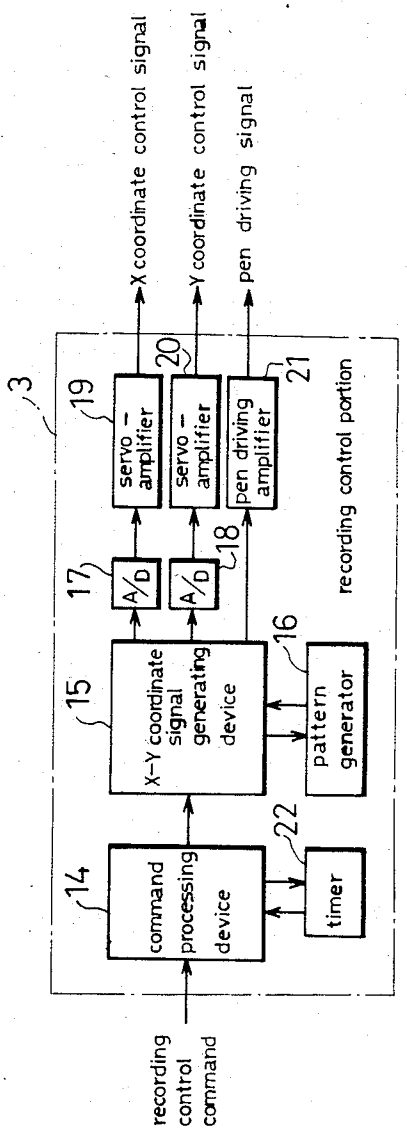
FIG. 4 is a block diagram showing a preferred embodiment of the recording control portion used in the present invention.

FIG. 4 illustrates a recording control portion 3 according to the present invention, which comprises a command processing device 14, X-Y coordinate signal generating device 15 connected to receive the output of the command processing device 14, a pattern generator 16 that supplies patterns to the X-Y coordinate signal generating device 15, D/A converters 17, 18 connected to the outputs of the X-Y coordinate signal generating device 15, servo-amplifiers 19 and 20 and a pendriving amplifier 21 amplifying the outputs of the D/A converters 17 and 18 and an output of the X-Y coordinate signal generating device 15, and a timer 22 connected to the command processing device 14.

The command processing device 14 analyzes recording control commands delivered from a host computer, and supplies codes representing the kinds of the patterns to be recorded and also the coordinate data related to the reference points for the patterns to the X-Y coordinate signal generating device 15. The command processing device 14 further selects an operational mode based on the condition of the timer 22.

The X-Y coordinate signal generating device 15 fetches out the vector (or stroke) data for the patterns corresponding to the codes supplied from the command processing device 14 from the pattern generator 16, and determines the coordinate values. The D/A converters 17 and 18 convert the coordinate values into analog signals, and apply the analog signals to the servo-amplifiers 19 and 20, respectively. The X-Y coordinate signal generating device 15 further delivers a driving signal, which drives a ball pen to its recording position, to the pen driving amplifier 21. The X-coordinate control signal, Y-coordinate control signal, and the pen driving signal delivered from the amplifiers 19, 20 and 21 are applied to the carriage motor 6, paper feed motor 9 and the electromagnet 11, respectively, for operating the same. Although an example utilizing analog control has been described above, it is apparent that the present invention may otherwise be applicable to those utilizing DDA or pulse control together with a step motor.

A mode control according to the present invention will now be described.

Figure 5:
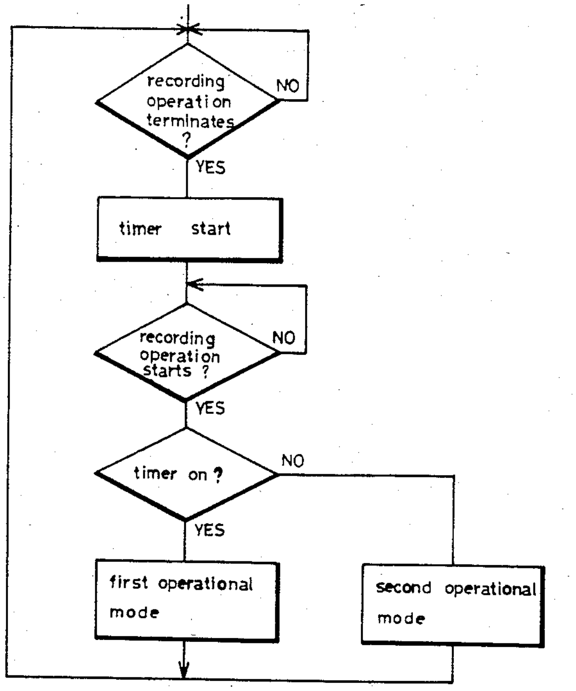
FIG. 5 is a flow chart for a command processing portion in the recording control portion.

Referring to FIG. 5 showing the operation of the command processing device 14, each time when the recording operation terinates, the device 14 starts to operate the timer 22 for maintaining the same in an operating (ON) state. The operating time period of the timer 22 has been beforehand set to a value (for instance one hour) which is obtained by subtracting a value considering safety from a maximum operable time length of the ball pen without drying ink and hence without causing thinning or breaking in the writing. This means that, when the timer 22 is in OFF state, there is a possibility of drying ink in the ball pen and causing thinning or breaking in the writing.

Thus, each time the command processing device 14 starts a recording operation, it checks the condition of the timer 22, and when the timer 22 is in the operating condition (ON state), it selects a first mode of operation where the characters and the like appearing in the initial part of the recording are written in a single pass of the ball pen, but when the timer 22 is found to be in the stopped state (OFF state), the command processing device 14 selects a second mode of operation in which the characters and the like appearing in the initial part of the recording are rewritten two or three times. The conditions of rewriting the characters, such as the number of the characters to be rewritten and the number of times to be rewritten are determined beforehand.

Figure 6:
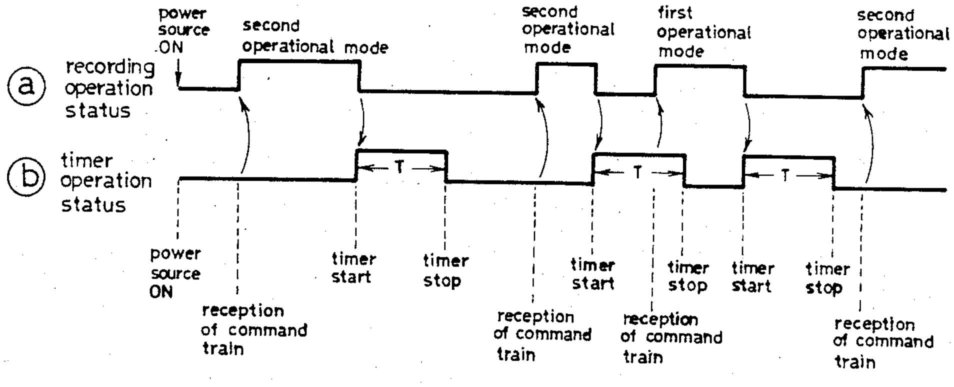
FIG. 6 is a timing diagram for the operation of the command processing portion.

FIG. 6 is a timing chart for the embodiment of the invention, wherein (a) indicates the recording status, while (b) indicates the operating status of the timer 22, and T represents the operating period of the timer 22. When the power source is turned ON, a first train of commands are received, and the recording thereof is initiated, the timer 22 is held in the stopped state (OFF state) and hence the second mode of operation for reprinting the initial part of the patterns is executed. Upon completion of the recording operation for the train of commands, the timer 22 is started to be held in the operating state (ON state) for the time period T. If the timer 22 is held in the operating state (ON state) when the subsequent train of commands are received, the first operational mode is selected. However, if the timer 22 is held in the stopped state (OFF state) at that time, the second operational mode is selected.

In case where the recording operation is started by turning the power source ON or after a long interruption time, the number of patterns to be reprinted or the number of repetition times in the reprinting operation in the second mode may be further increased as desired. Furthermore, in case where a straight line or a diagram is to be recorded, the operation may be so arranged that the recording operation is returned to the starting point after recording of a predetermined length (for instance 20 mm) or a predetermined time priod for reprinting the line or diagram.

According to the present invention, thinning or breaking of the recorded patterns tending to occur in the case of pen type plotting apparatus in the initial part of the record can be substantially eliminated without requiring the wasteful exercise writing as in some of the conventional apparatus.

What is claimed is:

1. A pen type recording apparatus comprising a pen type X-Y recording mechanism for driving a carriage supporting a pen, a recording paper, and the pen to their operative positions, and a recording control portion for controlling the pen type X-Y recording mechanism, said recording control portion comprising recording control means which provides a first operation mode for carrying out an ordinary recording operation, and a second operational mode for rewriting over a pattern for a predetermined number of times, and means for selecting said second operational mode when a recording operation is initiated upon activating a power source for the apparatus.

2. A pen type plotting apparatus comprising a pen type X-Y recording mechanism for driving a carriage supporting a pen, a recording paper, and the pen to their operative positions, and a recording control portion for controlling the pen type X-Y recording mechanism, said recording control portion comprising recording control means which provides a first operational mode for carrying out an ordinary recording operation, and a second operational mode for rewriting over a pattern for a predetermined number of times, a timer operable for a predetermined length of time, means for starting said timer each time a recording operation terminates, and means which surveys the operation status of said timer at initialization of each recording operation and selects said first operational mode when the timer is found to be in an operating state, while it selects said second operational mode when the timer is found to be in a stopped state.

* * * * *